US005496610A

United States Patent [19]
Landi et al.

[11] Patent Number: 5,496,610
[45] Date of Patent: Mar. 5, 1996

[54] MOLDABLE PANEL FOR CUSHIONING AND PROTECTING PROTRUSIONS AND AREAS, AND METHOD OF MAKING SAME

[75] Inventors: Curtis L. Landi; Susan L. Wilson, both of Sunnyvale, Calif.

[73] Assignee: Supracor Systems, Inc., Sunnyvale, Calif.

[21] Appl. No.: 184,574

[22] Filed: Jan. 21, 1994

[51] Int. Cl.$^6$ ............................................. B32B 3/12
[52] U.S. Cl. .................... 428/73; 156/197; 156/292; 428/116; 428/131; 428/542.8
[58] Field of Search ........................... 428/116, 73, 131, 428/118, 542.8; 156/197, 292

[56] References Cited

U.S. PATENT DOCUMENTS

| | | | |
|---|---|---|---|
| 4,211,590 | 7/1980 | Steward et al. | 428/138 X |
| 4,249,976 | 2/1981 | Hudson | 428/116 X |
| 4,422,183 | 12/1983 | Landi et al. | 428/116 X |
| 4,485,568 | 12/1984 | Landi et al. | 428/116 X |
| 4,956,217 | 9/1990 | Heitkamp | 428/116 |
| 5,007,976 | 4/1991 | Satterfield et al. | 428/247 X |
| 5,039,567 | 8/1991 | Landi et al. | 428/116 |
| 5,134,014 | 7/1992 | Zaima et al. | 428/186 |
| 5,134,790 | 8/1992 | Woitschaetzke et al. | 428/116 X |
| 5,180,619 | 1/1993 | Landi et al. | 428/116 |
| 5,203,607 | 4/1993 | Landi | 297/214 |

Primary Examiner—Henry F. Epstein
Attorney, Agent, or Firm—Claude A. S. Hamrick

[57] ABSTRACT

A moldable panel having a predetermined shape for cushioning and protecting protrusions and areas including a flexible elastomeric thermoplastic honeycomb panel and a rigid thermoplastic plate. The honeycomb panel has a honeycomb core formed of undulated strips of resilient thermoplastic material, thermal compression bonded together to form cell walls defining a plurality of contiguous regularly shaped cells. The core has a first face formed by a first extremity of the cell walls and a second face formed by a second extremity of the cell walls. The core is maintained in its expanded configuration so that it can be used to anisotropically flex to stabilize and spread the load experienced by a user of the moldable panel. The core is bonded to a first surface of the rigid thermoplastic plate. The plate is heated to a first temperature which is sufficient to mold or form the plate into the desired shape, but insufficient to melt the bonds formed between the honeycomb panel and the plate, and the bonds between the strips of the honeycomb panel. The second face of the honeycomb panel is heated to a second temperature, lower than said first temperature, to relieve stresses built up in the panel as the plate is being molded.

19 Claims, 7 Drawing Sheets

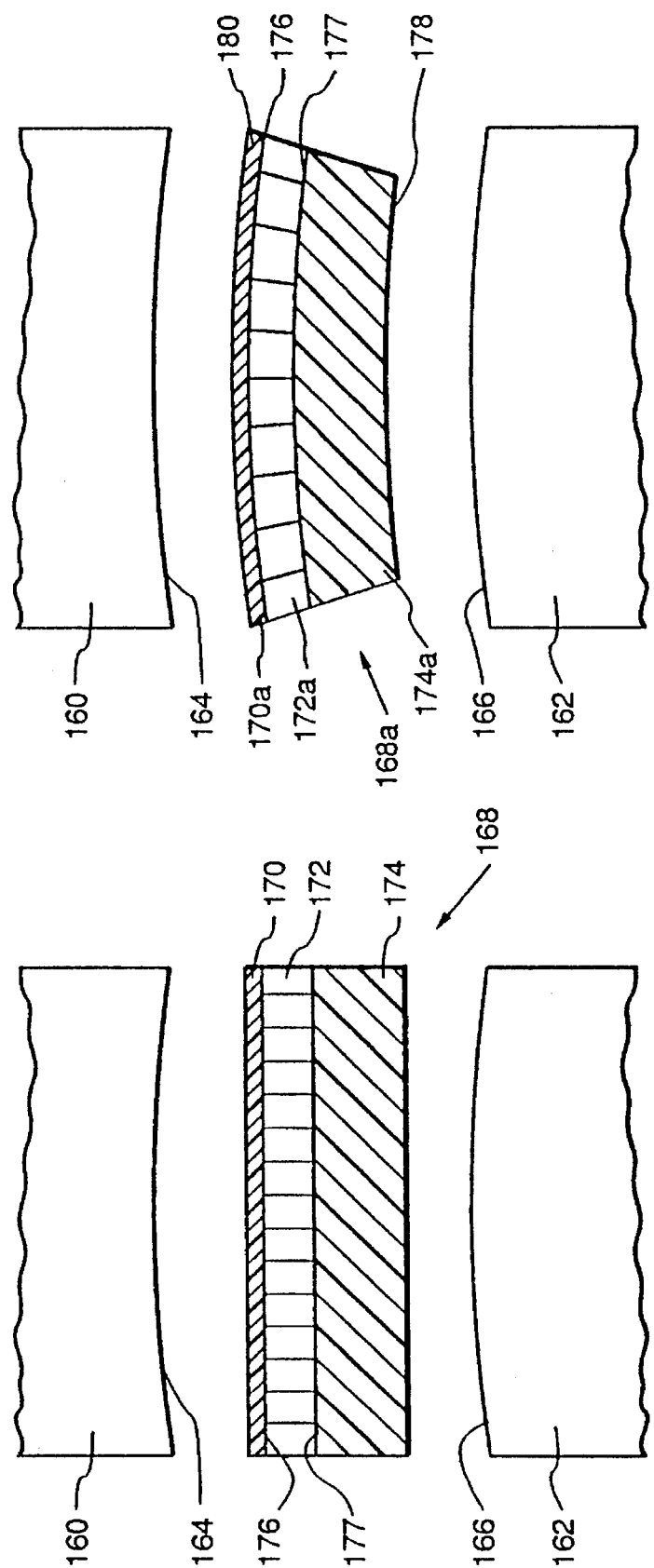

MOLDABLE PANEL FOR CUSHIONING AND PROTECTING PROTRUSIONS AND AREAS, AND METHOD OF MAKING SAME

BACKGROUND OF THE INVENTION

1. Field of the Invention

The present invention relates generally to an article for cushioning and protecting various protrusions and areas, and more particularly to a moldable panel including a rigid thermoplastic plate having at least one flexible thermoplastic elastomeric honeycomb panel affixed to it, the moldable panel being thermally formable into any desired shape or configuration.

2. Description of the Prior Art

Physical and sports-related activities are increasing in popularity and are drawing participants from larger and larger segments of the population. As the number of participants increase, the number of ill-conditioned participants also increases. As such there is an increasingly greater need to protect both experienced participants and those participants that are lacking in physical conditioning or proficiency from the physical impacts, rigors and risks prevalent in their chosen activities.

Protective body pads, such as knee and shin guards, bicycle seat pads, and other flexible and/or rigid body pads are widely used devices for protecting and cushioning various parts of the participant's body during sports-related or physical activities. Frequently, body pads incorporate rigid panels with flexible cushioning materials such as foams or gels. The rigid panel blunts the shock of an impact force and also spreads the force over a wide area. The cushioning material buffers the user's body from the rigid panel by absorbing impact forces imparted by the rigid panel to the body. In addition, the cushioning material shields the user from any rough or sharp surfaces of the rigid panel thereby comforting the user.

Foam materials are frequently used as a cushioning material in body pads. However, foams are very bulky for the amount of protection provided and yield very easily in the direction of impact. Thus, an effective impact absorbing foam pad must be relatively thick, bulky, relatively inflexible, and difficult to ventilate.

Honeycomb structures are widely used in body pads because they are flexible in the directions perpendicular to impact yet rigid in the direction of impact, and are very light in weight and give freedom of movement to the user. U.S. Pat. No. 4,422,183 issued to Landi et al, for example, discloses a protective shield including a core of light-weight flexible cellular honeycomb material with the axis of the honeycomb cell normal to the surface of the user's body. The disclosed device also includes a resilient foam elastomer layer to cover both open ends of a cell. However, the core is not constructed of a resilient material and, is prone to buckling upon impact to the shield.

Honeycomb core structures constructed from resilient materials have been used in body pads and shields. For example, U.S. Pat. No. 5,134,790 issued to Woitschaetzke et al. and U.S. Pat. No. 4,485,568 issued to Landi et al. disclose a flexible honeycomb material disposed in the sole of a shoe. In both devices the honeycomb material is not shaped to conform to the outer contours of the user's foot. Instead, the honeycomb material is shaped as a flat sheet which is disposed into a cavity formed in the midsole of the shoe. Because the honeycomb material is not shaped or contoured to accommodate the user's foot form, a shapeable layer (e.g. inner sole) must be placed on top of the midsole in order to cradle the user's heel and support the user's arch. This additional layer increases the weight of the shoe. More importantly, the inner sole does not effectively adhere to the midsole; it frequently slips along the midsole and bunches up in one side of the shoe causing discomfort and inconvenience for the user.

U.S. Pat. No. 5,203,607 issued to Landi discloses an improved bicycle seat having a rigid shell supporting a foam layer having a panel of thermoplastic elastomer honeycomb bonded thereto or embedded within. In this device, the rigid shell is initially formed into the shape of the bicycle seat. The honeycomb panel is then attached onto the rigid shell, and a covering material is used to sheath the shell and honeycomb panel. This product is costly to manufacture because the fabrication process is time consuming since the honeycomb panel must be extensively worked in order to attach it to the irregular contours of the formed shell.

Thus, there is a need for a panel for cushioning and protecting various protrusions and areas that overcome the deficiencies of the prevalent prior art devices.

SUMMARY OF THE INVENTION

Objects of this Invention

It is object of the present invention to provide a moldable panel that includes a rigid thermoplastic plate bonded to at least one thermoplastic elastomeric honeycomb panel, such that the plate and honeycomb panel are simultaneously thermally formable and then subsequently coolable so that they retain a desired shape.

It is another object of the present invention to provide a moldable panel having plurality of different thermoplastic elastomeric honeycomb panels arranged to customize the cushioning, and stiffness characteristics of the moldable panel.

Still another object of the present invention is to provide a method of making a moldable panel having a rigid thermoplastic plate bonded to at least one thermoplastic elastomeric panel such that the plate and honeycomb panel are simultaneously thermally formable and then subsequently coolable so that they retain a desired shape.

Briefly, a moldable panel having a predetermined shape for cushioning and protecting protrusions and areas includes a flexible elastomeric thermoplastic honeycomb panel and a rigid thermoplastic plate. The honeycomb panel has a honeycomb core formed of undulated strips of resilient thermoplastic material, thermal compression bonded together to form cell walls defining a plurality of contiguous regularly shaped cells. The core has a first face formed by a first extremity of the cell walls and a second face formed by a second extremity of the cell walls. The core is maintained in its expanded configuration so that it can be used to anisotropically flex to stabilize and spread the load experienced by a user of the moldable panel. The first face is bonded to a first surface of the rigid thermoplastic plate. The plate is heated to a first temperature which is sufficient to mold or form the plate into the desired shape, but insufficient to melt the bonds formed between the honeycomb panel and the plate, and the bonds between the strips of the honeycomb panel. The second face of the honeycomb panel is heated to a second temperature, lower than said first temperature, so as to receive any stresses built up in the honeycomb panel as the plate is being molded.

An important advantage of the present invention is that it provides a thermoplastic rigid plate bonded to a flexible elastomeric thermoplastic honeycomb panel such that the plate and honeycomb panel are simultaneously heat formable and subsequently coolable so that they retain a desired shape.

Another important advantage of the present invention is that it provides a moldable panel that is constructed from materials having improved cushioning and flexing characteristics.

Still another advantage of the present invention is that it provides a moldable panel that can be constructed from a plurality of honeycomb panel core design and configurations thereby customizing the cushioning and stability characteristics of the moldable panel.

These and other objects and advantages of the present invention will no doubt become apparent to those skilled in the art after having read the following detailed description of the preferred embodiment which is contained in and illustrated by the various drawing figures.

BRIEF DESCRIPTION OF THE DRAWINGS

In the accompanying drawing:

FIG. 4A and 4B illustrate a moldable panel and a subsequently molded panel of the present invention;

DETAILED DESCRIPTION OF THE PREFERRED EMBODIMENT

Figure 1:
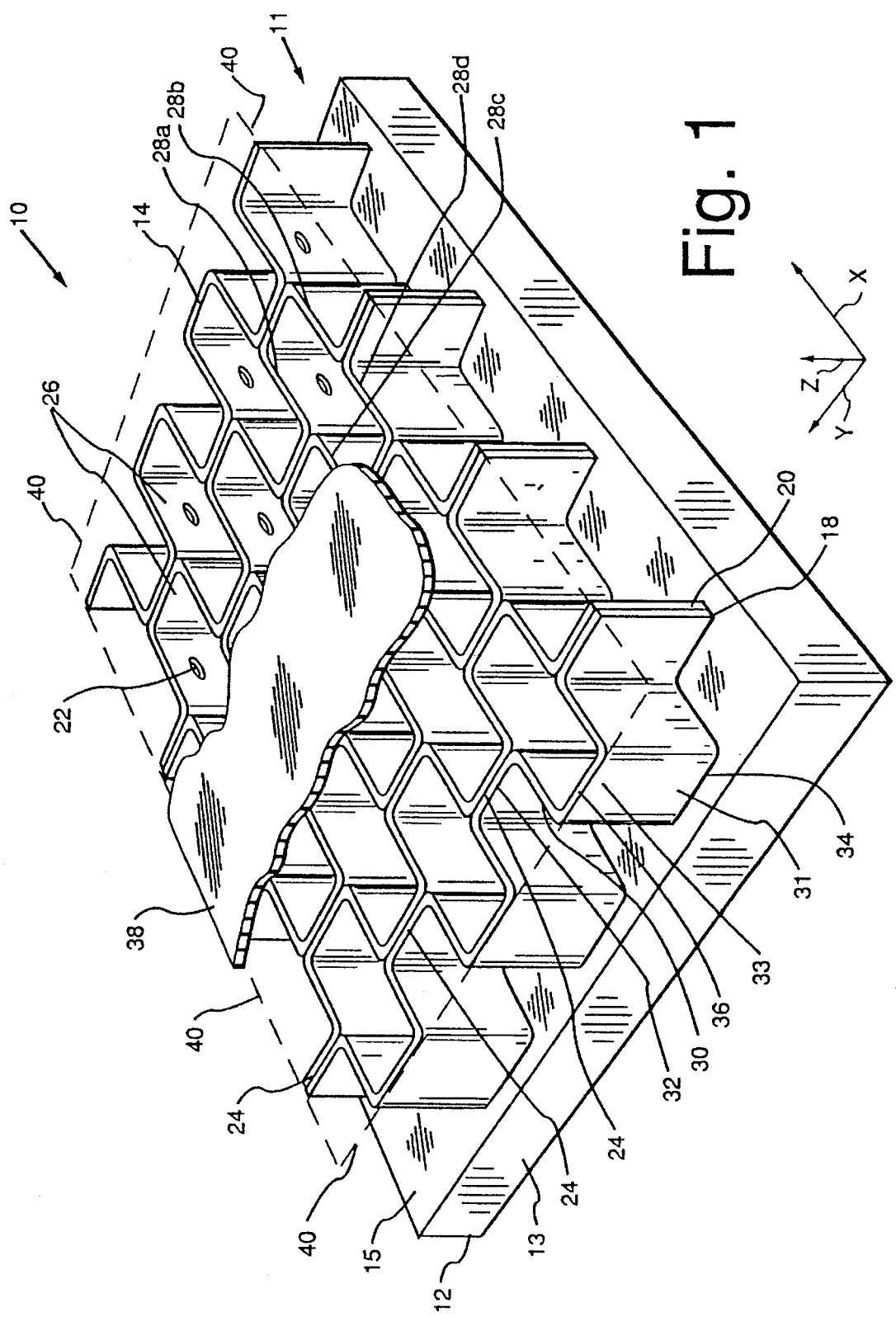
FIG. 1 is a perspective view depicting one embodiment of the moldable panel of the present invention.

FIG. 1 is a perspective view of a moldable panel 10 of the present invention, having a flexible thermoplastic elastomeric honeycomb panel 11 bonded to an inner surface 15 of a rigid thermoplastic plate 12. The panel 11 includes a honeycomb core 14 which is initially made from a stack of strips or ribbons 18 and 20 of a selected grade of thermoplastic elastomeric material some of which have been perforated such that a matrix of small holes 22 exists throughout. Although several sheets have been illustrated as perforated, it will be appreciated that in other embodiments, none or perhaps all of the sheets may be perforated. The sheets 18 and 20 are thermal compression bonded together at spaced intervals staggered between alternate strips, as depicted at bond joints 24. When the bonded stack is expanded this pattern of bonding results in a honeycomb of generally hexagonally or rectangularly shaped cells 26 (depending on the degree of expansion). The panel 11 manufacturing and fabrication is described in greater detail in our U.S. Pat. No. 5,039,567, incorporated herein by reference.

Each cell 26 of the honeycomb core 14 is defined by four generally S-shaped wall segments 28a–d, each of which is shared by an adjacent cell. As depicted, the wall segments 28 of each cell 26 includes a single thickness wall portion 30 and a double thickness wall portions 32 (including the bond joint 24).

Each wall segment 28 has an upper extremity 33 and a lower extremity 31. The core 14 has a lower "face" 34 and an upper "face" 36 either or both of which may be deformed during a planarization operation, as disclosed in the above-identified U.S. Patent, to stabilize the core 16 and prevent the expanded strip stack from collapsing. The lower face 34 is formed proximate to the lower extremity 31, the upper face 36 is formed proximate to the upper extremity 33. A solid or non-perforated facing sheet 38 (or a perforated facing sheet, not shown) made from a heavier gauge resilient thermoplastic material, may be thermal compression bonded to either or both faces 34 and/or 36. The facing sheet 38 is broken away to show the honeycomb panel 11 beneath. Dashed lines 40 illustrate the normal full coverage of the plate 12. The addition of one or two facing sheets further strengthens the core 14 and is another means (in addition to the planarization operation) for maintaining the core 14 in its expanded configuration. The facing sheets also provide an ample surface for adhering the panel 14 to an adjacent flat or curved surface. However a facing sheet is not required to establish a bond between the panel 14 and an adjacent panel or other surface. Also, a facing sheet provides additional cushioning for the user from jarring forces and impacts prevalent in physical activity.

The plate 12, having an outer surface 13 and the inner surface 15, is thermal compression bonded at the surface 15, to the lower face 34 of the core 14. Alternately, the plate could be bonded to the facing sheet 38.

The honeycomb panel 11 is tear-resistant, highly resilient, yet extremely light weight. The panel 11 (without facing sheets) is approximately 90 percent air, and is lighter than the foams normally used in prior art protection articles. Even with the facings attached, the weight of the panel 11 compares favorably with that of a foam core pad.

Another important quality of the panel 11 is that it is an anisotropic three-dimensional structure which has varying degrees of flex in its width (X), length (Y), and its thickness (Z) dimensions. In addition, the panel's 11 superior shock absorption and spring-back characteristics result from the use of thermoplastic (or thermoplastic elastomeric materials) for the core 14 and the facing sheets.

Selected combinations of elastomer material and durometer, honeycomb cell configuration, core thickness and facing material variables will determine the panel's 11 softness or hardness, resilient recovery rate, and rigidity or flex as required for a particular application. Additionally, by selection and combination of the ribbons 18, 20 of material that make up the core 14, or by varying the core 14 dimensions and cell 26 sizes, the flexibility of the resulting panel 11 can be predetermined. For example, the panel 11 can be made to have a greater stiffness (and lesser flexibility) along the outer area and a lesser stiffness (and greater flexibility) toward the inner area of the panel or vice-a-versa.

The facing and ribbon materials can be selected from a wide variety of films, including thermoplastic urethanes, EVAs, rubber or neoprene, elastomer impregnated fibers and various fabrics, etc., or combinations thereof. Additionally, environmental additives can be incorporated into the panel 11 to combat the body fluids, salts, direct sun and other environmental hazards when the panel 11 is to be used in such applications as bicycle seats or sports pads. A yellowing preventative can also be added and used where the facing sheet is transparent and the panel 11 is exposed to sunlight.

Figure 2A:
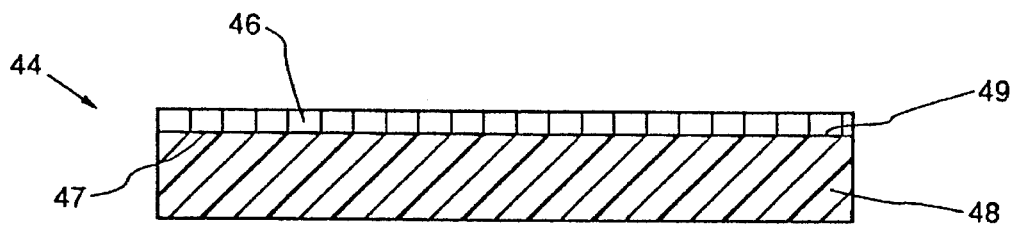
FIG. 2A through 2C are sectional views illustrating alternate embodiments of the moldable panel of the present invention, each embodiment including one rigid thermoplastic plate and one thermoplastic elastomeric honeycomb panel.
Figure 2B:
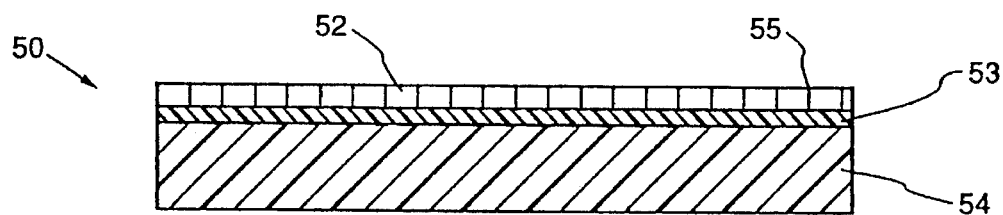
Figure 2C:
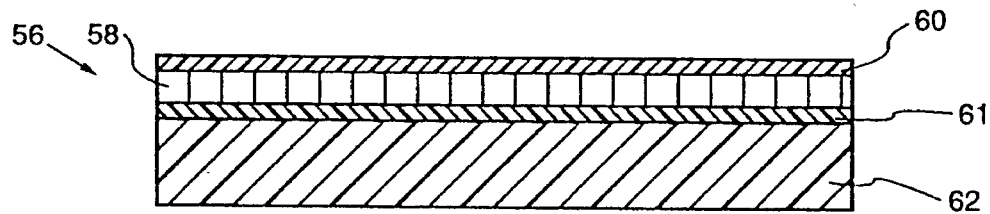

FIGS. 2A through 2C are sectional views illustrating various embodiments of a moldable panel of the present invention, each embodiment having one rigid thermoplastic plate bonded to one flexible thermoplastic elastomeric honeycomb panel. In FIG. 2A, a moldable panel 44 includes a honeycomb panel 46, without facing sheets, bonded to a rigid thermoplastic plate 48. The bonding between the panel 46 and the plate 48 is accomplished by methods known in the art. Thermal compression bonding, for example, is accomplished by simultaneously applying heat and pressure to the joinder between a face 47 of the panel 46 and an inner surface 49 of the plate 48. In FIG. 2B another moldable panel 50 is shown. The panel 50 includes a honeycomb panel 52 with an attached facing sheet 53, and a rigid thermoplastic plate 54. The facing sheet 53 is sandwiched between the panel 52 and the plate 54 and bonded to both. Alternately, the panel 52 could be bonded to the plate 54 along the core face 55. FIG. 2C illustrates a moldable panel 56 including a honeycomb panel 58 having two facing sheets 60 and 61 bonded thereto, and a rigid thermoplastic plate 62. The facing sheet 61 is illustrated as being bonded to the plate 62; however, either facing sheet could serve as the bonding surface to the plate 62.

The cell walls of the above-described moldable panel embodiments are illustrated as solid or non-perforated. However, the depicted moldable panel embodiments could include honeycomb panels wherein some or all of the cell walls are perforated.

Figure 3A:
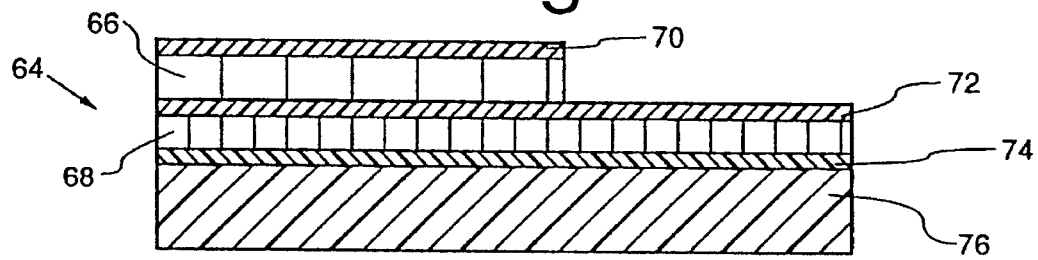
FIG. 3A through 3C illustrate other embodiments of the moldable panel of the present invention, each embodiment having one rigid thermoplastic plate and a plurality of thermoplastic elastomeric honeycomb panels.
Figure 3B:
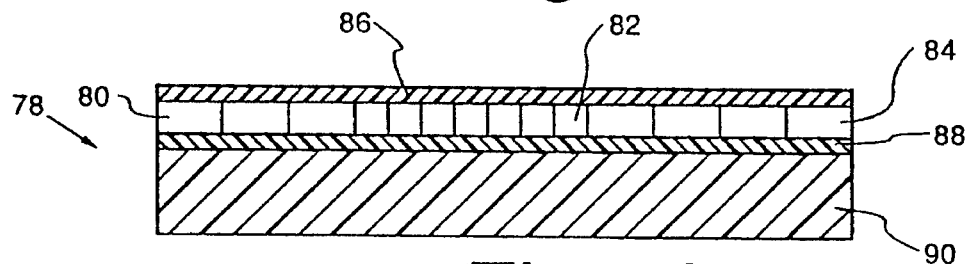

Turning now to FIG. 3A and 3B which are sectional views illustrating other embodiments of the moldable panel of the present invention each embodiment having a rigid thermoplastic plate and a plurality of flexible thermoplastic elastomeric honeycomb panels. FIG. 3A illustrates a moldable panel 64 having a honeycomb panel 66 bonded to a honeycomb panel 68, and a rigid thermoplastic plate 76. Panel 66 has a facing sheet 70 and panel 68 has facing sheets 72 and 74. The facing sheet 74 is bonded to both the panel 68 and the plate 76 and is sandwiched therebetween; the facing sheet 72 is disposed between and bonded to both the panels 66 and 68. Also, the panels 66 and 68 have different cell dimensions, and the panel 66 does not fully cover panel 68.

A facing sheet is not required to establish a bond between an adjacent plate and panel, or between adjacent panels. Also, another facing sheet may be bonded to the opposite unfaced face of the panel 66. Alternately, adjacent panels can have generally identical cell dimensions, and can be sized such that they fully cover each another.

FIG. 3B depicts a moldable panel 78 having three honeycomb panels 80, 82, and 84 bonded to a rigid thermoplastic plate 90. The honeycomb panels 80, 82, and 84 share common facing sheets 86 and 88. However, the panels 80, 82, and 84 may be bonded to the plate 90 without facing sheets. Also, the two panels 80 and 84 have generally similar cell dimensions. It will be appreciated that more than three honeycomb panels could be bonded to the plate 90, and the cell configuration of each of the panels could be generally similar or different from any of the other panels. Although the cell walls of the panel embodiments illustrated in FIG. 3A–3B are shown as solid or non-perforated, they could, in alternate designs, be perforated.

Figure 3C:
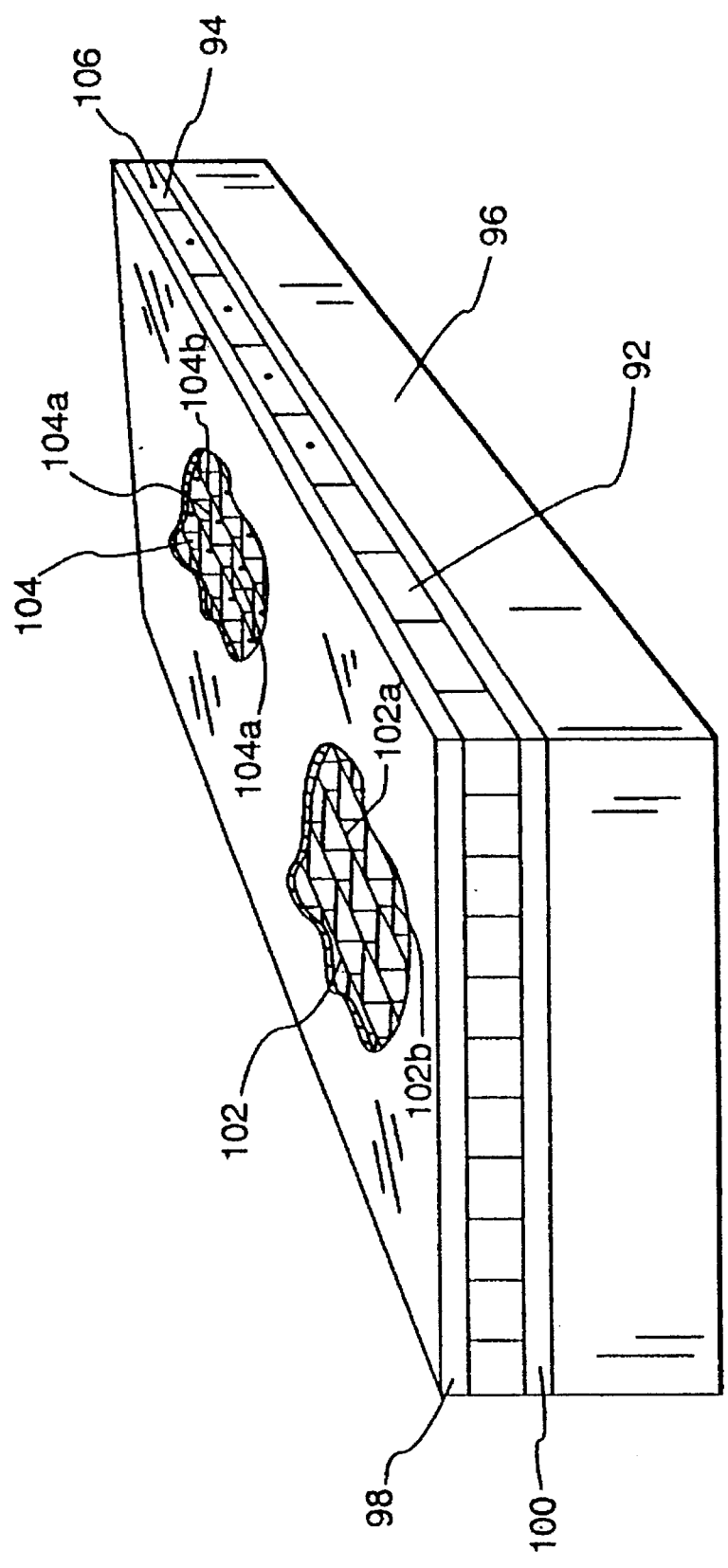
Figure 3D:
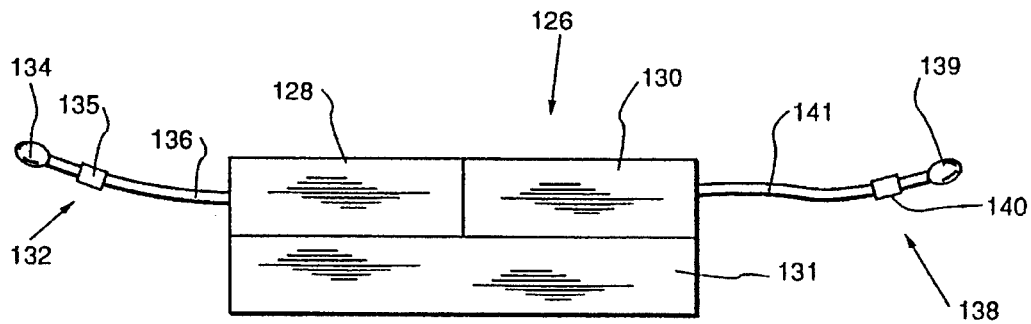
FIG. 3D through 3F depict yet other embodiments of the moldable panel of the present invention, each embodiment having one rigid thermoplastic plate and a plurality of pressurized thermoplastic elastomeric honeycomb panels.

FIG. 3C is a perspective view illustrating a moldable panel 91 having two honeycomb panels 92, 94, bonded to a surface of a rigid thermoplastic plate 96. The panels 92 and 94 share common facing sheets 98 and 100. In addition, some or all of the cell walls of core 104 of panel 94 are perforated. In the panel 91, the panels 92 and 94 utilize different core orientation to customize the support and flexibility of the panel 91. For example, as illustrated, the panel 94 is oriented such that the double wall portions 104a of the core 104 are directed perpendicular to the double wall portions 102a of the core 102 of the panel 92 (correspondingly, the single wall portions 104b and 102b of the respective cores 104 and 102 are directed perpendicularly towards one another) thereby resulting in differing degrees of flexibility in different parts of the panel 91. In addition, the core 104 is perforated with a plurality of holes 106 thereby increasing the flexibility of panel 94 with respect to panel 92.

Figure 3E:
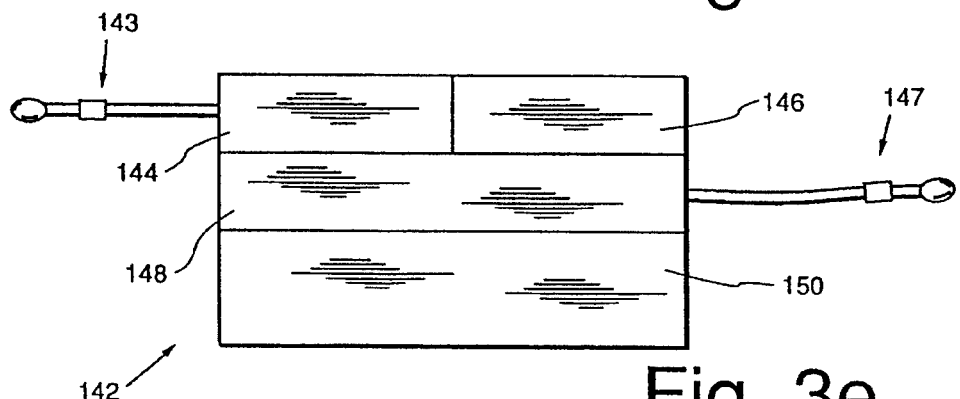
Figure 3F:
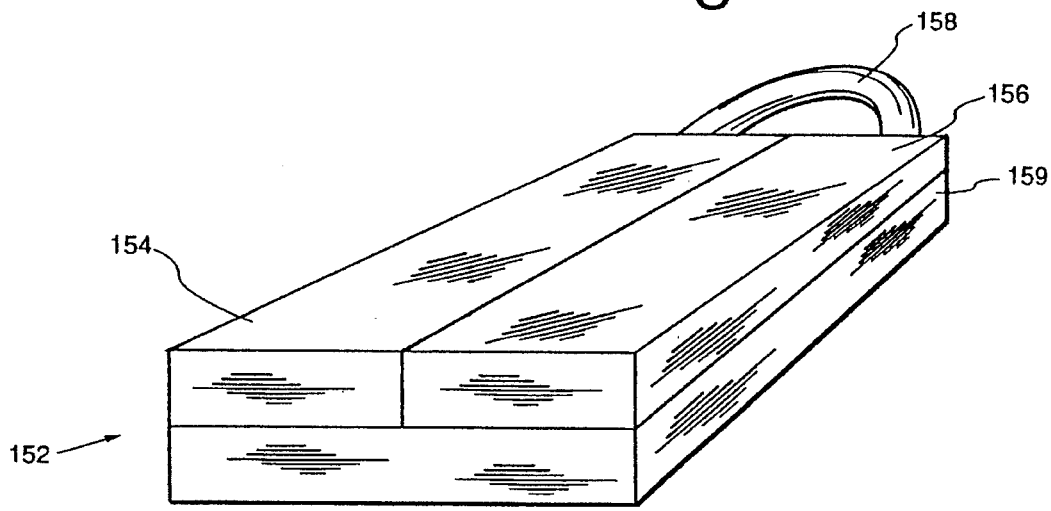

FIG. 3E and 3F are side elevation views of other embodiments of the present invention. In FIG. 3E, a moldable panel 126 is illustrated, and includes a rigid thermoplastic plate 131 and two pressurized honeycomb panels 128 and 130 bonded thereon. The honeycomb panels 128 and 130 are pressurized and perforated core panels and are described in greater detail in our co-pending patent application Ser. No. 07/974474, filed Nov. 12, 1992, and incorporated herein by reference. Each panel 128 and 130 is bonded to the plate 131 and includes pump subsystems 132 and 138 respectively. As illustrated, a bulb pump 134 is communicatively coupled to the panel 128 via the conduit 136 and an exhaust valve 135 is installed in the conduit 136. Similarly, a bulb pump 139 is communicatively coupled to the panel 130 via the conduit 141, and an exhaust valve 140 is installed in the conduit 141. The operation of the pump and exhaust valve to selectively pressurize and depressurize the respective panels is described in greater detail in the above-identified co-pending patent application.

FIG. 3F is a side elevation view of a moldable panel 142 which includes three flexible honeycomb panels 144, 146, and 148 and a rigid thermoplastic plate 150. The pressurized honeycomb panel 148 is bonded to the plate 150, and a pressurized honeycomb panel 144 and a non-pressurized panel 146 are bonded to the panel 148. The pressurized panels 144 and 148 and their associated pump subsystems 143a and 147a are used to maximize the cushioning and protection characteristics of the panel 142 by selectively pressurizing and depressurizing the pressurized panels 144 and 148.

FIG. 3G is perspective view of a moldable panel 152 including two interconnected pressurized honeycomb panels 154 and 156, each of the panels being bonded to a rigid thermoplastic plate 159. The panels are interconnected via a conduit 158 such that the cushioning and protecting characteristics of the panel 152 can be altered depending on which portion of the panel 152 is impacted. For example, if a portion of the panel 152 cushioned by panel 154, is impacted then gas or fluid flows from panel 154 into panel 156 via conduit 158. The cushioning and protecting capability of the portion of the panel 152 covered by panel 156 is increased as the panel 154 is impacted.

In all of the embodiments illustrated in FIGS. 2A through 3G, leather vinyl or similar materials could be fused or glued to the surfaces of the flexible honeycomb panels either before or after molding.

FIG. 4A and 4B illustrates both a generally flat or planar moldable panel 168, and a molded panel 168*a* (i.e. the panel 168 after it has been molded into a predetermined desired shape). The honeycomb panel 172 of the moldable panel 168 is fabricated in the manner disclosed in the earlier-identified patent. A facing sheet 170 is then bonded to a core face 176 of the honeycomb panel 172, and the inner surface of a rigid thermoplastic plate 174 is bonded to the opposite face 177 of the panel 172 to form the generally flat or planar moldable panel 168.

The bonding between the facing sheet 170 and the face 176 of the honeycomb panel 172, or between the plate 174 and the face 177 of the honeycomb panel 172 is accomplished by methods known in the art. Thermal compression bonding, for example, may be used to bond the facing sheet 170 to the face 176 and the plate 174 to the face 177.

As illustrated in FIG. 4A, the moldable panel 168 is disposed between a first heatable mold 160 and a second heatable mold 162. Each of the heatable molds 160 and 162 has an associated heatable forming surface 164 and 166, respectively. The heatable forming surface 164 of the mold 160 is brought into physical contact with the facing sheet 170 attached to the panel 172. Similarly, the heatable forming surface 166 of the mold 162 physically contacts the rigid plate 174. The forming surfaces 164 and 166 are shaped such that if the forming surfaces 164 and 166 are heated and the panel 168 is compressed therebetween, the panel 168 will be heat formed or molded into the desired shape.

Each heatable mold and its corresponding heatable forming surface is heated to a predetermined temperature level. Typically, the forming surface 164 of the mold 160 is heated to a first temperature and the forming surface 166 of the hot mold 162 is heated to a second[ temperature, the first temperature being lower than the second temperature. The first and second temperatures must be high enough to sufficiently soften the rigid plate 174, the panel 172, and the facing sheet 170 to make them workable. However, the selected temperatures must not be so high so as to overheat the honeycomb panel 172 and delaminate the bonds between the facing sheet 170 and the core face 176, or the bonds between the honeycomb panel 172 and the rigid plate 174, or the bonds between the ribbons of the core of the panel 172.

Once heated, the molds are then moved together to compress the panel 168 disposed therebetween. As the panel 168 is compressed, the second temperature of the forming surface 166 is sufficiently high enough to soften the adjacent plate 174, and the compressive force is high enough to form the plate into the shape imposed by the forming surface 166. As the rigid plate 174 is heat formed, the attached flexible honeycomb panel 172 and facing sheet 170 are stretched to conform to the changing shape of the heat formed plate 174. The stretching causes stresses to build up in the attached panel 172 and facing sheet 170 as the rigid plate 174 is formed. The first temperature of the forming surface 164 of the first mold 160 is sufficiently high to relax and reduce the stresses built up in the panel 172 and facing sheet 170 thereby allowing the moldable panel 168 to be formed without cracks or tears occurring in the flexible panel 172 or attached facing sheet 170.

As shown in FIG. 4B, the molds 160 and 162 are separated from the molded panel 168*a* thereby cooling the formed thermoplastic plate 174*a*, the formed thermoplastic facing sheet 170*a* and the formed honeycomb panel 172*a*, and causing these items to harden to the desired shape. Thus, the moldable panel 168 has been heat formed and subsequently cooled to form the molded panel 168*a* of the desired shape, and has a formed surface 180 and a formed surface 178 that generally match the forming surfaces 164 and 166 respectfully.

The novelty of this invention is in simultaneously molding the rigid plate 174 and the honeycomb panel 172 into the desired shape, thereby forming a shaped or curved panel quickly and at lower manufacturing expense. In prior art devices, a rigid plastic shell is first molded, formed, or cast into the desired shape and the flexible thermoplastic elastomeric honeycomb panel is worked and stretched in order to attach it to a contoured surface of the shell. A curved or shaped device can be fabricated but at considerable manufacturing expense and time.

The disclosed process is not limited to the moldable panel configuration illustrated in FIG. 4A and 4B. A variety of moldable panel configurations (some of which were illustrated previously) may be molded by this process. Also, many combinations of rigid plate and flexible honeycomb panel materials may be used so long as the working temperatures of the material of the rigid plate are higher than the corresponding temperatures of the materials of the flexible honeycomb panel.

An exemplary combination includes a rigid plate 174 of polycarbonate material having a thickness of 0.020 inch, a facing plate 170 of TPU material of 85A durometer having a thickness of 0.020 inch. A honeycomb core 172, sandwiched between the plate 174 and the sheet 170, is fabricated from an ether based (TPU) polyurethane thermoplastic elastomer of 85A durometer and having a 0.250 inch cell diameter, 0.010 inch thick ribbon wall gauge, and an overall core thickness of 0.500 inch. In order to mold the panel, the surface 166 (i.e. the platen in contact with the plate 174), is heated to 290° F. and is held in contact with the plate 174 for 30 seconds at 80 psi. The surface 164 is heated to 210° F. and is held in contact with the facing sheet 170 for 20 seconds at 20 psi.

Figure 5:
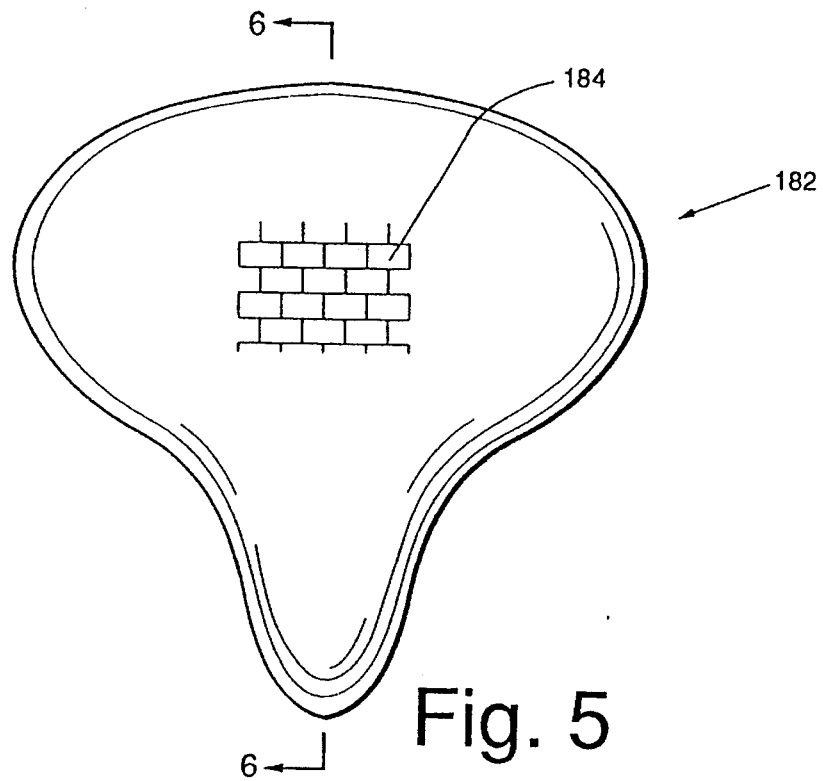
FIG. 5 is a plan view of the moldable panel of the present invention molded for use as a padded bicycle seat.
Figure 6:
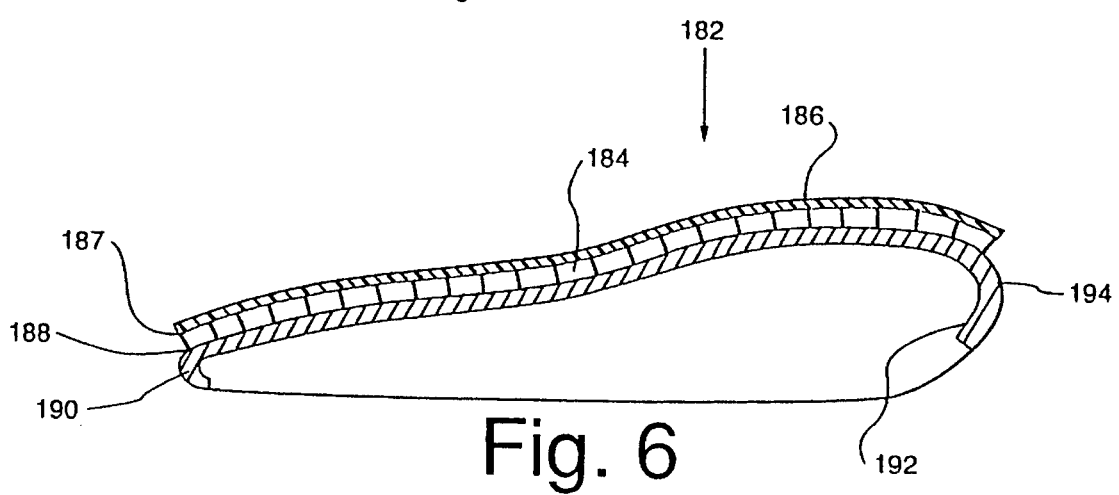
FIG. 6 is a cross-sectional view, taken along the line 6—6, of the moldable panel illustrated in FIG. 5.

Referring now to FIG. 5 which is a top plan view illustrating an application of a moldable panel of the present invention. More specifically, a moldable panel 182 is formed for use as a bicycle seat. FIG. 6 is a cross-sectional view, taken along the line 6—6, of the moldable panel 182 illustrated in FIG. 5. The panel 182 includes a flexible elastomeric thermoplastic honeycomb panel 184 attached to a rigid thermoplastic plate 190. The plate 190, includes an outer surface 192 and an inner surface 194, and is constructed from a rigid "high-impact" plastic material that includes ABS, polycarbonate, nylon, polyester, polypropylene, and other similar materials familiar to those skilled in the art.

The panel 184 is bonded to the inner surface 194 of the plate 190 along a lower face 188 of the panel 184. A facing sheet 186 is bonded to the panel 184 along an upper face 187. The panel 184 is generally similar to the panel 11 illustrated in FIG. 1, and is generally formed, in the manner described in the above-identified U.S. Patent, from elastomeric material such as urethane, PVC, or elastomeric polypropylene. The panel 184 may have perforated or non-perforated facing sheets, may be unfaced or faced on one or both faces of the core, and may have perforated or non-perforated cell walls.

It is important to select compatible materials for the plate 190 and the honeycomb panel 184. For example, ABS or polycarbonate shells are compatible with TPU honeycomb panels, polypropylene shells can be used with elastomeric polypropylene honeycomb panels.

Figure 7:
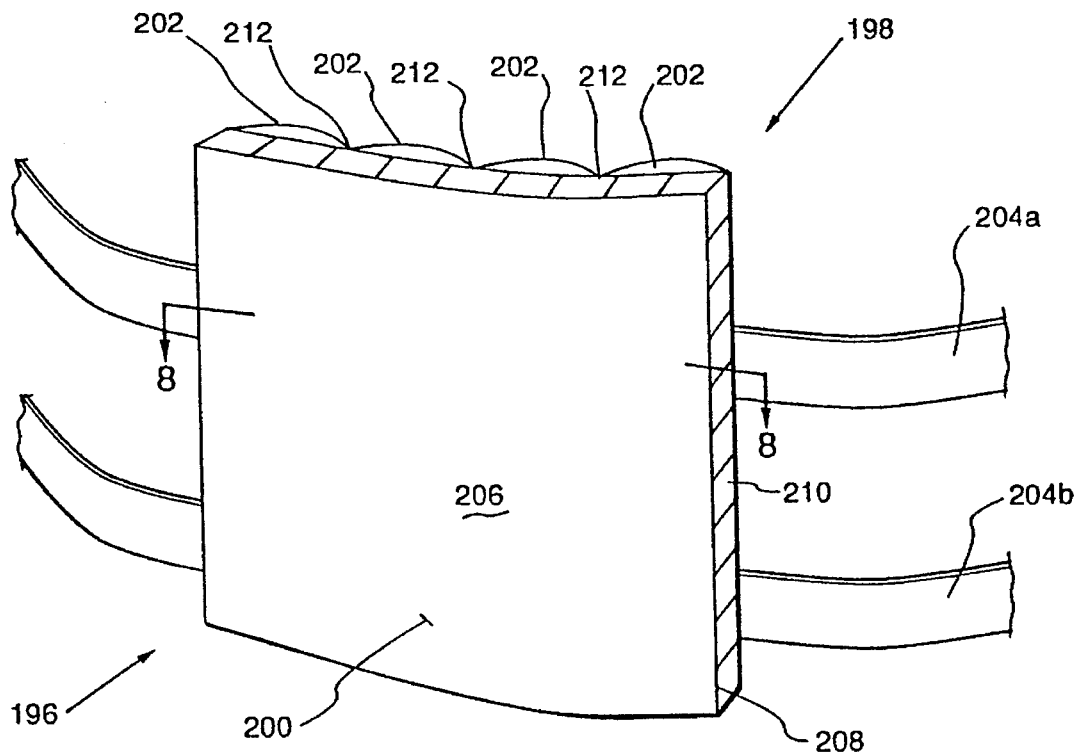
FIG. 7 is a perspective view illustrating another application of the moldable panel of the present invention being molded for use as a protective pad or shin guard.
Figure 8:
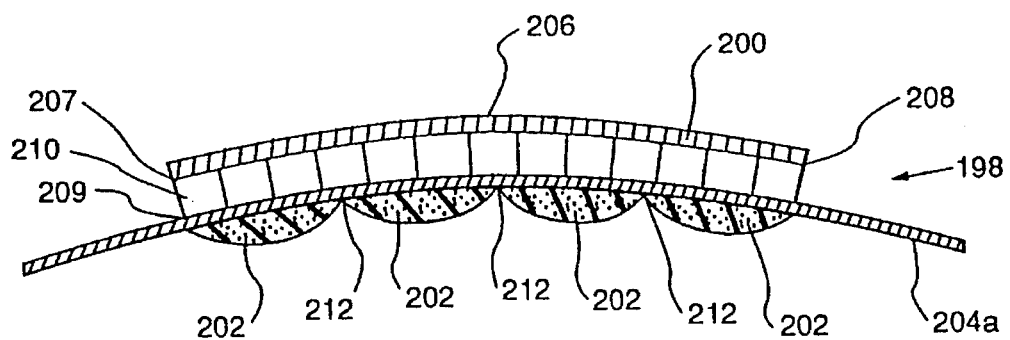
FIG. 8 is a cross sectional view, taken along the line 8—8, of the moldable panel illustrated in FIG. 7.

FIG. 7 is a perspective view illustrating another application of a moldable panel of the present invention. In this application a moldable panel 196 used as a body pad. FIG. 8 is a cross-sectional view, taken along a line 8—8 of the panel 196 illustrated in FIG. 7. Referring to FIG. 7 and 8, the panel 196 includes a rigid thermoplastic plate 200, a flexible elastomeric honeycomb panel 198 (generally similar to the panel 11 depicted in FIG. 1), a fabric layer 202, and attachment straps 204a and 204b.

The plate 200 has an outer surface 206 and an inner surface 208. Although the outer surface 206 has been depicted as featureless, it may be formed with a variety of surface features, e.g. raised ridges disposed parallel to each other, ridges disposed perpendicular to each other, etc. In addition, the plate 200 may be formed in any shape to shield or cover a variety of areas or protrusion, e.g. a shoulder, hip, elbow, knee, etc.

A first face 207 or first facing sheet, (not shown) of the panel 198 is attached to the inner surface 208 of the plate 200 in a manner known in the prior art. The attachment straps 204a and 204b are disposed onto an opposite second face 209 or opposite second facing sheet (not shown) of the panel 198. Finally, the fabric layer 202 is further disposed over the straps 204a and 204b such that the panel 198 is sandwiched between the plate 200 and the fabric layer 202.

With regard to the assembly of the panel 196, the plate 200 is initially in a generally planar or flat shape. The panel 198 is thermal compression bonded to the inner surface 208 of the plate 200 by simultaneously applying heat and pressure to the inner surface 208 and either the first face 207 of the panel 198. The straps 204a and 204b, and fabric layer 202 are then disposed onto the second face 209 of the panel 198. The straps 204a and 204b, and the fabric layer 202 are then bonded to the panel 198 during an operation that seals the exposed or open cells, e.g. side walls 210, of the panel 198. During the sealing operation, a device (not shown) depresses the fabric layer 202 along a plurality of pressure application edges 212 thereby causing the bonding of the fabric layer 202 and the underlying nylon straps 204a and 204b to the second face 209 of the honeycomb panel 198. Thus, in one sealing operation, the nylon straps 204a and 204b, and the fabric layer 202 are attached to the honeycomb panel 198 and the rigid plate 200. Finally, the bonded plate 200 and panel 198 are formed, in the manner described earlier, into the desired shape of the pad 196. Alternately, the bonded panel 198 and the rigid plate 200 could be initially formed into the desired shape then the straps 204a and 204b, and the fabric layer 202 could be bonded to the formed panel 198.

Many combinations of rigid plate and flexible honeycomb panel materials may be used so long as the working temperatures of the rigid plate material are higher than the working temperatures of the honeycomb panel material. The combinations of rigid plate and flexible honeycomb panel materials used in the above described bicycle seat application may be used in this application as well. Also, the fabric layer 202 can be made from breathable fabrics such as GORTEX® and the like, or from open cell foam fabrics, leather and/or simulated leather. If a perforated cell wall honeycomb panel is used, greater breathability of the pad and ventilation of the pad user will be achieved.

The device as illustrated may be used as a protective body pad for covering various body parts, such as elbows, arms, knees, shoulders and the like. Alternately, a moldable device may be formed into cups, or other liquid containing vessels wherein the rigid plate provides an impervious barrier for holding the liquid, and the honeycomb panel acts as an insulating layer for the liquids contained therein.

Although preferred, and alternate embodiments and applications of the present invention have been disclosed above, it will be appreciated that numerous applications, alterations and modifications thereof will no doubt become apparent to those skilled in the art after having read the above disclosures. It is therefore intended that the following claims may be interpreted as covering all such applications, alterations and modifications as fall within the true spirit and scope of the invention.

What is claimed is:

1. A moldable panel for cushioning and protecting protrusions and areas, comprising:
   (a) a first panel including
      (i) a honeycomb core formed of undulated strips of resilient thermoplastic material, thermal compression bonded together, along a plurality of first bond joints, to form cell walls defining a plurality of contiguous regularly shaped cells, said core having a first face formed by a first extremity of said cell walls and a second face formed by a second extremity of said cell walls, and
      (ii) means for maintaining said core in its expanded configuration so that it can anisotropically flex to stabilize and spread a load applied thereto;
   (b) a rigid thermoplastic plate having a first surface and a second surface, said first surface of said plate being thermal compression bonded, along a plurality of second bond joints, to said first face to said core of said first panel;
   (c) said rigid plate being modable when heated to a first temperature which is sufficient to render said rigid plate flexible but insufficient to melt said first bond joints and said second bond joints; and
   (d) said first panel being deformable when heated to a second temperature which is sufficient to relieve stresses built up in said first panel as said plate is being molded but is lower than said first temperature and insufficient to melt said first bond joints and said second bond joints.

2. A moldable panel as recited in claim 1, wherein said means for maintaining includes:
   (a) a planarizing thermal compression deformation of said first face of said core formed by said first extremities of said cell walls, said first face bonded to said first surface of said plate.

3. A moldable panel as recited in claim 2, wherein said means for maintaining includes:
   (a) a planarizing thermal compression deformation of said second face of said core formed by said second extremities of said cell walls.

4. A moldable panel as recited in claim 3, further including:
   (a) at least one other panel including
      (i) a honeycomb core formed of undulated strips of resilient thermoplastic material, thermal compression bonded together to form cell walls defining a plurality of contiguous regularly shaped cells, and core having a first face formed by a first extremity of said cell walls and a second face formed by a second extremity of said cell walls;
      (ii) means for maintaining said core in its expanded configuration so that it can be used to anisotropically flex to stabilize and spread the load exerted by said user, said first face of said core of said other panel bonded to said first surface of said plate.

5. A moldable panel as recited in claim 3, further including:
   (a) at least one other panel including
      (i) a honeycomb core formed of undulated strips of resilient thermoplastic material, thermal compression bonded together to form cell walls defining a plurality of contiguous regularly shaped cells, said core having a first face formed by a first extremity of said cell walls and a second face formed by a second extremity of said cell walls;
      (ii) means for maintaining said core in its expanded configuration so that it can be used to anisotropically flex to stabilize and spread the load exerted by said user, said first face of said core of said other panel bonded to said second face of said first panel.

6. A moldable panel as recited in claim 1, wherein said means for maintaining further includes:
   (a) a planarizing thermal compression deformation of said first face of said core formed by said first extremities of said cell walls, a first facing sheet of said resilient thermoplastic material bonded to said first face, said first facing sheet bonded to said first surface of said plate.

7. A moldable panel as recited in claim 6, further comprising:
   (a) at least one other panel including
      (i) a honeycomb core formed of undulated strips of resilient thermoplastic material, thermal compression bonded together to form cell walls defining a plurality of contiguous regularly shaped cells, said core having a first face formed by a first extremity of said cell walls and a second face formed by a second extremity of said cell walls;
      (ii) means for maintaining said core in its expanded configuration so that it can be used to anisotropically flex to stabilize and spread the load exerted by said user said first face of said core of said other panel bonded to said first surface of said plate.

8. A moldable panel as recited in claim 6, further including:
   (a) at least one other panel including
      (i) a honeycomb core formed of undulated strips of resilient thermoplastic material, thermal compression bonded together to form cell walls defining a plurality of contiguous regularly shaped cells, said core having a first face formed by a first extremity of said cell walls and a second face formed by a second extremity of said cell walls;
      (ii) means for maintaining said core in it expanded configuration so that it can be used to anisotropically flex to stabilize and spread the load exerted by said user, said first face of said core of said other panel bonded to said second face of said first panel.

9. A moldable panel as recited in claim 6, wherein said, means for maintaining further includes:
   (a) a planarizing thermal compression deformation of said second face of said core formed by said second extremities of said cell walls, a second facing sheet of said resilient thermoplastic material bonded to said second face.

10. A moldable panel as recited in claim 9, wherein said cell walls of at least some of said cells of said first panel have perforations therein.

11. A moldable panel as recited in claim 10, further including:
    (a) at least one other panel including
       (i) a honeycomb core formed of undulated strips of resilient thermoplastic material, thermal compression bonded together to form cell walls defining a plurality of contiguous regularly shaped cells, said core having a first face formed by a first extremity of said cell walls and a second face formed by a second extremity of said cell walls;
       (ii) means for maintaining said core in its expanded configuration so that it can be used to anisotropically flex to stabilize and spread the load exerted by said user, said first face of said core of said other panel bonded to said first surface of said plate.

12. A moldable panel as recited in claim 10, further including:
    (a) at least one other panel including
       (i) a honeycomb core formed of undulated strips of resilient thermoplastic material, thermal compression bonded together to form cell walls defining a plurality of contiguous regularly shaped cells, said core having a a first face formed by a first extremity of said cell walls and a second face formed by a second extremity of said cell walls;
       (ii) means for maintaining said core in its expanded configuration so that it can be used to anisotropically flex to stabilize and spread the load exerted by said user, said first face of said core of said other panel bonded to said second face of said first panel.

13. A moldable panel as recited in claim 10, wherein said first facing sheet and said second facing sheet of said first panel are sealingly joined together about the perimeter of said core to provide a hermetically sealed chamber.

14. A moldable panel as recited in claim 13 further including:
    (a) means fluid-communicatively coupled to said first panel for selectively adding gas to or substracting gas from said sealed chamber, said gas flowing through the perforations of said walls and surface cells to change certain characteristics of said first panel.

15. A moldable panel as recited in claim 14, further including:
    (a) at least one other panel including
       (i) a honeycomb core formed of undulated strips of resilient thermoplastic material, thermal compression bonded together to form cell walls defining a plurality of contiguous regularly shaped cells, said core having a first face formed by a first extremity of said cell walls and a second face formed by a second extremity of said cell walls;
       (ii) means for maintaining said core in its expanded configuration so that it can be used to anisotropically flex to stabilize and spread the load exerted by said user, said first face of said core of said other panel bonded to said first surface of said plate.

16. A moldable panel as recited in claim 14, further including:
    (a) at least one other panel including
       (i) a honeycomb core formed at undulated strips of resilient thermoplastic material, thermal compression bonded together to form cell walls defining a plurality of contiguous regularly shaped cells, said core having a first face formed by a first extremity of said cell walls and a second face formed by a second extremity of said cell walls;

(ii) means for maintaining said core in its expanded configuration so that it can be used to anisotropically flex to stabilize and spread the load exerted by said user, said first face of said core of said other panel bonded to said second face of said first panel.

17. A moldable panel as recited in claim 1, further including:
   (a) at least one other panel including
      (ii) a honeycomb core formed of undulated strips of resilient thermoplastic material, thermal compression bonded together to form cell walls defining a plurality of contiguous regularly shaped cells, said core having a first face formed by a first extremity of said cell walls and a second face formed by a second extremity of said cell walls;
      (ii) means for maintaining said core in its expanded configuration so that it can be used to anisotropically flex to stabilize and spread the load exerted by said user, said first face of said core of said other panel bonded to said first surface of said plate.

18. A moldable panel as recited in claim 1, further including:
   (a) at least one other panel including
      (i) a honeycomb core formed of undulated strips of resilient thermoplastic material, thermal compression bonded together to form cell walls defining a plurality of contiguous regularly shaped cells, said core having a first face formed by a first extremity of said cell walls and a second face formed by a second extremity of said cell walls;
      (ii) means for maintaining said core in its expanded configuration so that it can be used to anisotropically flex to stabilize and spread the load exerted by said user, said first face of said core of said other panel bonded to said second face of said first panel.

19. The method of molding a moldable article into a desired shape for cushioning and protecting protrusions and areas, said moldable article including
   a rigid thermoplastic plate having a first surface and a second surface,
   at least one panel including
      (i) a honeycomb core formed of undulated strips of resilient thermoplastic material, thermal compression bonded together to form cell walls defining a plurality of contiguous regularly shaped cells, said core having a first face formed by a first extremity of said cell walls and a second face formed by a second extremity of said cell walls, and
      (ii) means for maintaining said core in its expanded configuration so that it can anisotropically flex to stabilize and spread a load applied thereto,
   said first surface of said plate being bonded to said first face of said panel to form a bonded plate and panel having a plate face and a panel face, said method comprising the steps of:
   (a) heating said plate face of said bonded plate and panel to a first temperature and heating said panel face of said bonded plate and panel to a second temperature, to produce a heated plate and panel,
      said first temperature being sufficient to render said plate moldable but insufficient to melt said bonds formed between said panel and said first surface of said plate, and said bonds formed between said strips of said first panel, and
      said second temperature being lower than said first temperature and sufficient to relieve stresses built up in said panel as said plate is molded into said desired shape;
   (b) molding said heated plate and panel to form a molded plate and panel having said desired shape; and
   (c) cooling said molded plate and panel to return said plate to its rigid state whereby said molded plate and panel retain said desired shape.

\* \* \* \* \*